Figure 1:
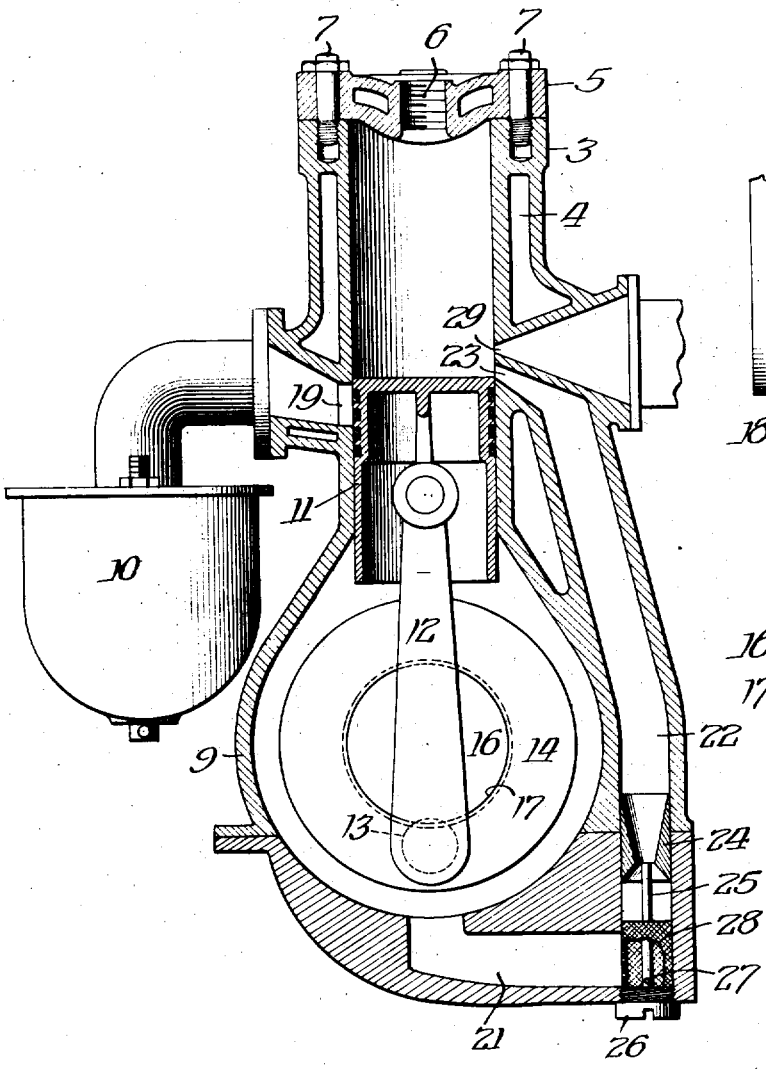

May 6, 1924. Re. 15,832

W. A. EDWARDS

GAS ENGINE

Original Filed June 6, 1919

Witness:
Geo. C. Davison

Inventor:
William A. Edwards.
By Jas. J. Wilson Atty.

Reissued May 6, 1924. Re. 15,832

UNITED STATES PATENT OFFICE.

WILLIAM A. EDWARDS, OF CHICAGO, ILLINOIS, ASSIGNOR, BY DIRECT AND MESNE ASSIGNMENTS, TO THE TUBULAR CORPORATION, OF CHICAGO, ILLINOIS, A CORPORATION OF DELAWARE.

GAS ENGINE.

Original No. 1,360,383, dated November 30, 1920, Serial No. 302,198, filed June 6, 1919. Application for reissue filed October 1, 1921. Serial No. 504,772.

*To all whom it may concern:*

Be it known that I, WILLIAM A. EDWARDS, a citizen of the United States, residing at Chicago, in the county of Cook and State of Illinois, have invented certain new and useful Improvements in Gas Engines, of which the following is a specification.

This invention relates in general to gas engines, and more particularly to the two cycle type in which the gas is preliminarily compressed in the crank case from which it is delivered into the engine cylinder.

In this type of gas engine the gasolene which condenses in the crank case and the heavier particles of the lubricating oil which is fed in with the gasolene, condense and collect in the bottom of the crank case, and feed intermittently in slugs through the passage leading from the crank case into the cylinder, which would result in imperfect explosion and cause uneven running of the engine.

One of the primary objects of this invention is the provision of means for vaporizing the liquids which accumulate in the bottom of the crank case so that they will be fed in the form of vapor to the engine cylinder instead of in rich liquid slugs, and thereby the imperfect intermittent explosions are eliminated and a smooth, efficient and rhythmic operation of the engine is secured.

Another object of my invention is to further break up and vaporize the explosive mixture in its travel between the crank case and the engine cylinder so as to thereby increase the efficiency of the engine.

Still another object is the provision of novel means for supplying oil to the wrist pin of the engine crank so as to insure adequate lubrication of this wrist pin during operation. My invention and many of its inherent advantages will be readily appreciated by those skilled in the art by reference to the following description when considered in connection with the accompanying drawings.

Referring to the drawings,—

Figure 2:
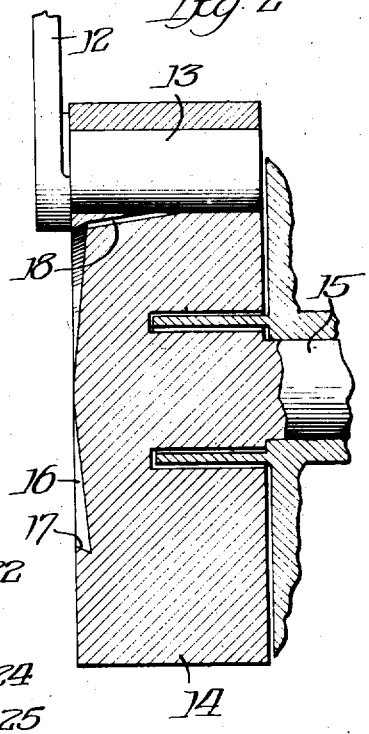

Fig. 1 is a vertical sectional view, through one cylinder of a two cycle engine embodying my invention; and Fig. 2 is a fragmentary sectional view through the fly wheel and wrist pin.

By reference to the drawings, it will be observed that reference character 3 indicates generally the cylinder walls of a two cycle engine provided with the usual water jacket 4. The top or cylinder cap 5, which may be of any preferred construction, equipped with the tapped opening 6 for a spark plug, is secured in position by the usual studs or stay bolts 7. The crank case, designated generally by reference character 9, is of the closed type and communicates with the lower end of the cylinder, the crank case and cylinder being shortly coupled but permitting sufficient clearance for the operation of the connecting link or piston rod. Within the cylinder the piston 11 is adapted to be reciprocated by means of the connecting rod 12, which is equipped at its lower end with a wrist pin 13 fitted into the fly wheel 14 mounted upon the engine shaft 15. For the purpose of insuring a supply of lubricant to the wrist pin, the outer face of the fly wheel is provided with a recess 16 increasing in depth from the center toward the perimeter of the wheel, the circumferential walls of the recess being undercut, as indicated at 17, and adjacent the wrist pin, the recess communicates with the wrist pin bearing through a duct 18. When the engine is in operation, oil from the crank case will be thrown by centrifugal force to the periphery of the recess 16 and forced through the duct 18 to the wrist pin bearing, thereby insuring adequate lubrication of this bearing.

The explosive mixture is supplied from a carbureter 10 to the crank case through a port 19 located in the lower portion of the cylinder so that it will be fully opened to admit gas to the crank case when the piston is in its uppermost position, and will be entirely closed by the piston when the piston has moved downwardly a portion of its stroke. The partial vacuum created in the crank case by the piston on its upward stroke causes the explosive mixture to rush inwardly through the port 19 as soon as the piston clears the port in its upward travel, and upon downward movement of the piston, this mixture, trapped in the crank case by closure of the port 19, will be compressed by the piston in the usual manner.

The bottom of the crank case is provided with a passage 21 which is inclined downwardly to its junction with the vertical passage 22 opening through the intake port 23 into the cylinder. The condensed gasolene, oil drippings, and other liquid which has a tendency to accumulate in the crank case, will flow through this passage 21 to the lower end thereof where it will tend to accumulate, while the lighter gas will flow directly from the passage 21 into the passage 22 and thence into the cylinder. The lower end of the passage 21 thus serves as a collecting chamber for the liquids above mentioned.

For the purpose of breaking up the particles of gasolene in the mixture and further vaporizing the mixture during its passage from the crank case to the cylinder, I have mounted in the passage 22 a Venturi tube 24. The action of this tube upon the mixture flowing therethrough further vaporizes the mixture so that it is delivered to the cylinder with the gasolene particles thoroughly broken up and mixed with the air.

For the purpose of causing an even feeding of the condensed particles of gasolene and lubricating oil which tend to accumulate at the lower end of the passage 21 to the cylinder in finally vaporized condition, I have mounted in the lower end of the passage 21 a vertical tube 25, the upper end of which terminates in the throat of the venturi. This tube is preferably carried by a screw plug 26 which can be readily removed for purposes of cleaning the tube when necessary, and near its lower end it is provided with a plurality of ports or openings 27 through which air, gas and the liquid accumulation at this point may enter the tube and be drawn by the vacuum created in the throat of the venturi upwardly through the tube and delivered into the venturi where these liquid particles are thoroughly broken up and vaporized by the action of the venturi. In order to protect the openings 27 against clogging, I prefer to surround the lower end of the tube 25 with a screen 28, as shown in Fig. 1.

During the operation of the engine the mixture from the crank case will flow under pressure when the port 23 is open, through the Venturi tube and the suction exerted by the tube 25 will cause some of the mixture to flow through this tube. All oil, condensed gasolene, and other liquids from the crank case tending to accumulate in the passage 21 will be drawn into the tube 25 through the ports 27 and will be delivered by this tube into the throat of the venturi where they will be thoroughly broken up, dissipated and mixed with the explosive charge so that an even feeding to the cylinder will result and no liquid slugs will be delivered to the cylinder which would impair the even and rhythmic operation of the engine. The burnt gases in the cylinder are discharged therefrom through the exhaust port 29 by the force of the incoming charge in a manner which is well understood.

It is believed that my invention and many of its inherent advantages will be understood from the foregoing without further description, but it should be obvious that various changes in the structural details disclosed may be resorted to without departing from the spirit of the invention as defined in the following claims.

I claim:

1. A two cycle engine, comprising a cylinder, a closed crank case, a passage leading from the bottom of said crank case to said cylinder, and vaporizing means disposed in said passage.

2. A two cycle engine, comprising a cylinder, a closed crank case, a passage connecting said cylinder with said crank case, and means for vaporizing the liquid tending to accumulate in said crank case.

3. A two cycle engine, comprising a cylinder, a crank case, means for vaporizing the liquid tending to accumulate in said crank case, and means for delivering said vaporized liquid to said cylinder.

4. A two cycle engine, comprising a cylinder, a crank case, a passage connecting said cylinder and crank case, a venturi disposed in said passage, and means for delivering liquids from said crank case into the throat of said venturi.

5. A two cycle engine, comprising a cylinder, a crank case, a passage connecting said cylinder and crank case, a venturi disposed in said passage, and a tube communicating with the throat of said venturi and with the point of accumulation of liquids from said crank case.

6. The combination with an internal combustion engine comprising a cylinder, an intake port adapted to receive the fuel mixture from the carburetor connected to said intake port, and a passage extending from the intake port to the cylinder through which the fuel mixture passes from the carburetor to the cylinder, said passage having a portion where condensate therein accumulates; of a venturi disposed in said passage, and a delivery duct communicating with said venturi and with the point of accumulation of condensate in said passage whereby the condensate is drawn through the duct by the vacuum in the venturi and said condensate thoroughly broken up and atomized by the action of the venturi.

7. In a reatomizer, the combination of a fitting adapted to be inserted in a mixture passage to form a part of said passage and comprising a restriction, a collector having an opening adapted to intercept ingoing liquid, and a connection from the collector to the passage at the restriction.

8. In a reatomizer, the combination of a fitting adapted to be inserted in a mixture passage to form a part of said passage and comprising a restriction, a collector having an opening adapted to intercept ingoing liquid, and a connection from the collector to the passage at the restriction, the discharge of the connection being remote from the wall of the passage.

WILLIAM A. EDWARDS.